United States Patent [19]
Tucker et al.

[11] Patent Number: 5,982,936
[45] Date of Patent: Nov. 9, 1999

[54] PERFORMANCE OF VIDEO DECOMPRESSION BY USING BLOCK ORIENTED DATA STRUCTURES

[75] Inventors: Michael R. Tucker; Geoffrey S. Strongin; Yi Liu, all of Austin, Tex.

[73] Assignee: Advanced Micro Devices, Inc., Sunnyvale, Calif.

[21] Appl. No.: 08/892,551

[22] Filed: Jul. 14, 1997

Related U.S. Application Data

[63] Continuation of application No. 08/423,768, Apr. 18, 1995, abandoned.

[51] Int. Cl.$^6$ .................................................. G06K 9/36
[52] U.S. Cl. ............................................................ 382/233
[58] Field of Search ................................. 382/232, 233, 382/236, 238, 240, 248, 250; 358/432, 433, 539; 348/384, 394, 395, 400, 401–404, 407–416, 420, 421, 425, 430, 431, 699

[56] References Cited

U.S. PATENT DOCUMENTS

| | | | |
|---|---|---|---|
| 5,054,103 | 10/1991 | Yasuda et al. | 382/56 |
| 5,144,424 | 9/1992 | Savatier | 348/405 |
| 5,164,828 | 11/1992 | Tahara et al. | 358/136 |
| 5,226,093 | 7/1993 | Iwase | 382/41 |
| 5,293,481 | 3/1994 | Mita et al. | 395/163 |
| 5,329,318 | 7/1994 | Keith | 348/699 |
| 5,353,062 | 10/1994 | Maeda | 348/412 |
| 5,369,438 | 11/1994 | Kim | 348/402 |
| 5,379,356 | 1/1995 | Purcell et al. | 382/250 |
| 5,386,232 | 1/1995 | Golin et al. | 348/391 |
| 5,408,328 | 4/1995 | Boliek et al. | 358/433 |
| 5,416,522 | 5/1995 | Igarashi | 348/416 |
| 5,452,104 | 9/1995 | Lee | 358/433 |
| 5,455,629 | 10/1995 | Sun et al. | 348/402 |
| 5,502,493 | 3/1996 | Meyer | 348/426 |
| 5,510,840 | 4/1996 | Yonemitsu et al. | 348/402 |
| 5,559,557 | 9/1996 | Kato | 348/405 |
| 5,563,961 | 10/1996 | Rynderman et al. | 382/239 |
| 5,577,191 | 11/1996 | Bonomi | 395/502 |
| 5,610,657 | 3/1997 | Zhang | 348/415 |
| 5,617,142 | 4/1997 | Hamilton | 348/405 |
| 5,621,820 | 4/1997 | Rynderman et al. | 382/239 |
| 5,627,765 | 5/1997 | Robotham et al. | 364/514 |

FOREIGN PATENT DOCUMENTS

| | | |
|---|---|---|
| 0 535 746 | 9/1992 | European Pat. Off. . |
| 0 587 443 A2 | 9/1992 | European Pat. Off. . |
| 0 542 195 A2 | 5/1993 | European Pat. Off. . |

OTHER PUBLICATIONS

Dr. Richard Baker, "Standards Dominate Videoconferencing Implementation", Computer Design, Dec. 1994, pp. 66–70.

Stephen Ohr, "Digital Video Spearheads TV and Videoconferencing Applications", Computer Design, Dec. 1994, pp. 59–64.

Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb. 1994, pp. 1–11.

P1180/D1, "Draft Standard Specification for the Implementations of 8×8 Inverse Discrete Cosine Transform", May 29, 1990, pp. 1–9.

Peng H. Ang, et al., "Video Compression Makes Big Gains", IEEE Spectrum, Oct. 1991, pp. 16–19.

Kevin L. Gong, et al., "Parallel MPEG–1 Video Encoding", Report, University of California, Berkeley, Computer Science Division, 1994, pp. 1–14.

(List continued on next page.)

*Primary Examiner*—Jose L. Couso
*Attorney, Agent, or Firm*—Skjerven, Morrill, MacPherson, Franklin & Friel, LLP

[57] ABSTRACT

A video decoding system that selectively arranges video information within a memory to correspond to macroblocks of video information. Such a system advantageously increases the efficiency of processing video information when decoding compressed video information.

27 Claims, 8 Drawing Sheets

OTHER PUBLICATIONS

ISO/IEC 11172–1, Information Technology–Coding of Moving Pictures and Associated Audio for Digital Storage Media at up to about 1,5 Mbits/s—Part 1: Systems, Aug. 1, 1993, pp. i–vi, 1–53.

ISO/IEC 11172–2, Information Technology–Coding of Moving Pictures and Associated Audio for Digital Storage Media at up to about 1,5 Mbit/s—Part 2: Video, Aug. 1, 1993, pp. i–ix, 1–112.

ISO/IEC 11172–3, Information Technology–Coding of Moving Pictures and Associated Audio for Digital Storage Media at up to about 1,5 Mbit/s—Part 3: Audio, Aug. 1, 1993, pp. i–vi, 1–150.

IEEE Transactions on Circuits and Systems, vol. 36, no. 10, Oct. 1989, New York US, pp. 1275–1280, XP00005314 Schmidt: "A Memory Control Chip Formatting Data into Blocks Suitable for Video Coding Applications".

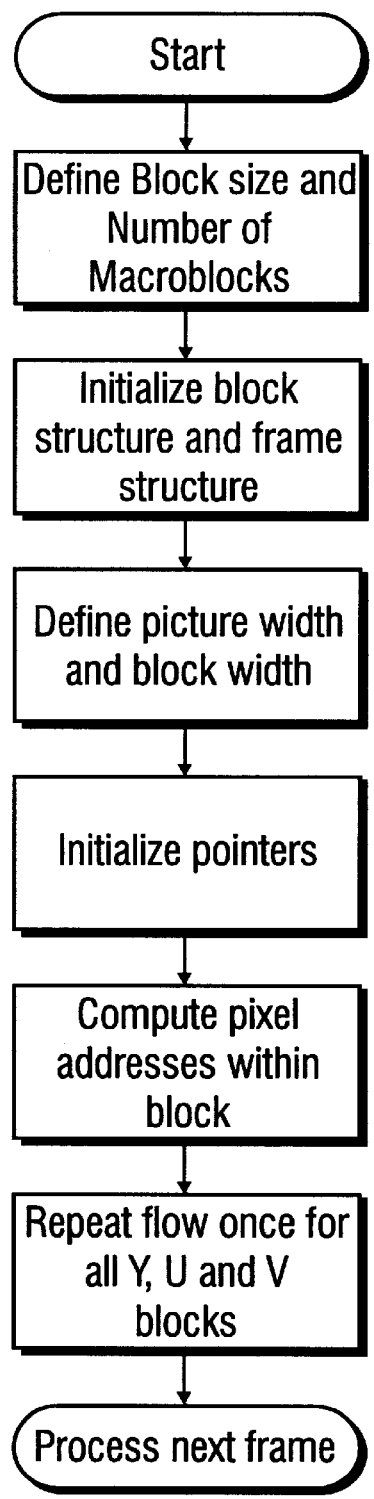
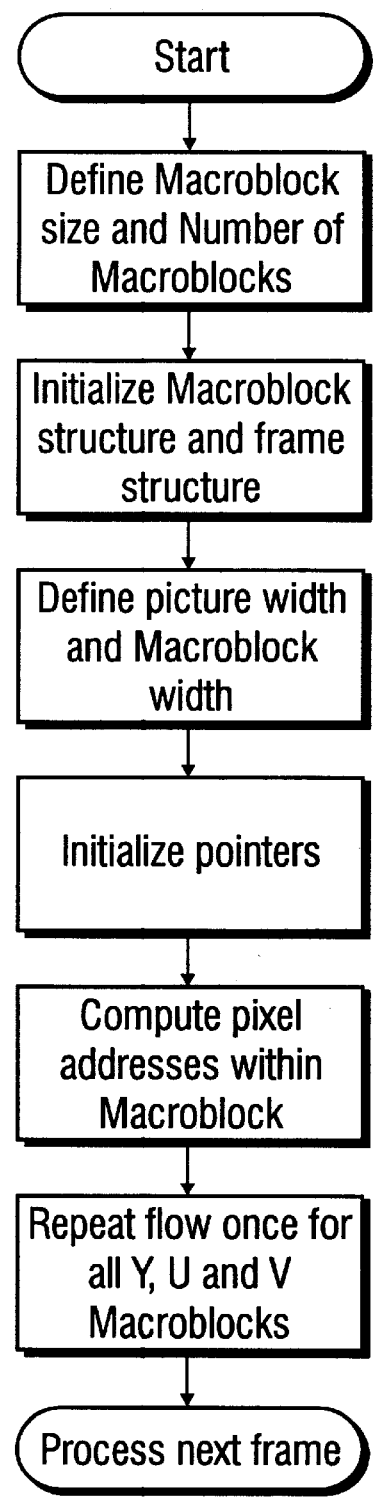
FIG. 8
FIG. 10

PERFORMANCE OF VIDEO DECOMPRESSION BY USING BLOCK ORIENTED DATA STRUCTURES

CROSS-REFERENCE TO RELATED APPLICATIONS

This application is a continuation of application Ser. No. 08/423,768, filed on Apr. 18, 1995, now abandoned.

BACKGROUND OF THE INVENTION

The present invention relates to decompression and, more particularly, to decompression of video information.

Because video information requires a large amount of storage space, video information is generally compressed. Accordingly, to display compressed video information which is stored, for example on a compact disk read only memory (CD ROM), the compressed video information must be decompressed to provide decompressed video information. The decompressed video information is then provided in a bit stream to a display. The bit stream of video information is generally stored in a plurality of memory storage locations corresponding to pixel locations on a display, the stored video information is generally referred to as a bit map. The video information required to present a single screen of information on a display is called a frame. A goal of many video systems is to quickly and efficiently decode compressed video information so as to provide motion video.

Generally motion video information is compressed, i.e., encoded, as a sequence of frames. Accordingly, to present the video information on a display screen, the compressed sequence of frames must be decompressed, i.e., decoded. One compression standard which has attained wide spread use for compressing and decompressing video information is the moving pictures expert group (MPEG) standard for video encoding and decoding.

Frames within the MPEG standard are divided into 16×16 pixel macroblocks. Each macroblock includes six 8×8 blocks: four luminance (Y) blocks, two chrominance (U and V) blocks. The luminance blocks correspond to sets of 16×16 pixels on a display and control the brightness of respective pixels. Each pair of U and V chrominance pixels to a large extent control the colors for sets of four pixels. For each set of four pixels on the display, there is a single U pixel characteristic and a single V pixel characteristic.

For example, referring to FIG. 1, labeled prior art, a frame presented by a typical display includes 240 lines of video information in which each line has 352 pixels. Accordingly, a frame includes 240×352=84,480 pixel locations. Under the MPEG standard, this frame of video includes 44 by 30 luminance blocks or 1320 blocks of luminance video information. Additionally, because each macroblock of information also includes two corresponding chrominance blocks, each frame of video information also includes 330 Y blocks and 330 U blocks. Accordingly, each frame of video information requires 126,720 pixels=1,013,760 megabits of bit mapped storage space for presentation on a display.

There are three types of frames of video information which are defined by the MPEG standard, intra-frames (I frame), forward predicted frames (P frame) and bi-predicted frames (B frame).

An I frame is encoded as a single image having no reference to any past or future frame. Each block of an I frame is encoded independently. Accordingly, when decoding an I frame, no motion processing is necessary. However, for the reasons discussed below, it is necessary to store and access I frames for use in decoding other types of frames.

A P frame is encoded relative to a past reference frame. A reference frame is a P or I frame. The past reference frame is the closest preceding reference frame. Each macroblock in a P frame can be encoded either as an I macroblock or as a P macroblock. A P macroblock is stored as a translated 16×16 block of a past reference frame plus an error term. To specify the location of the P macroblock, a motion vector (i.e., an indication of the relative position of the translated block in the previous reference frame to its position in the current frame) is also encoded.

A B frame is encoded relative to the past reference fame and a future reference frame. The future reference frame is the closest succeeding reference frame and the past reference frame is the closest preceding reference frame. Accordingly, the encoding of a B frame is similar to that of an P frame with the exception that a B frame motion vector may refer to areas in the future reference frame. For macroblocks that use both past and future reference frames, the two 16×16 areas are averaged. When decoding a B frame the current B macroblock is obtained by using macroblocks from past and or future reference frames plus an error term. The macroblocks from past and future reference frames are offset by motion vectors.

Referring to FIG. 2, in a typical decoding function, a frame is stored sequentially within memory. More specifically, the Y blocks of the frame are stored together sequentially (i.e., the first row of the frame is stored together, and then the next row, and so on), followed by the U blocks, which are stored together sequentially, followed by the V blocks, which are stored together sequentially. Accordingly, video information is stored in memory to correspond to physical locations of pixels within the frame without regard to the relationship of pixels within the same 8×8 block of video information.

Typical microprocessors employ caches. A cache is a small, fast memory which stores copies of the most frequently used information which is stored within a main memory. A common cache memory structure is a set associative cache; the set associative cache is organized in a two dimensional array of data lines, i.e., in a number of "sets" of data lines. The data lines are typically 16 to 32 bytes long. A two-way set associative cache is a two dimensional array which includes two sets of data lines.

Each microprocessor implements a cache fill method which attempts to fill the cache with data which is likely to be required by a program in the near future. A typical method is to fill an entire cache line when a memory location which is not already stored in the cache is accessed. The cache line is filled with the memory location being accessed plus additional nearby memory locations to fill the remaining portion of the cache line. This cache fill method is employed on most microprocessor since it is simple to implement.

Referring to FIG. 3, an example of cache addressing when a frame of video data is stored line by line in a main memory, but the data is decompressed block by block is shown. The data being decompressed is stored within the cache. More specifically, when the first pixel of chrominance block M is accessed (assuming it is not already present within the cache), 32 bytes of data are written into the cache. At most, only 8 bytes of the 32 bytes are associated with chrominance block M and the rest of the bytes are associated with chrominance blocks M+1, M+2 and so on. Pixel data in blocks M+1 and M+2 are typically not needed until after the processing of block M is completed and therefore, because of cache replacement techniques, this data is unlikely to still be in the cache when the data is needed. Also, when the second line of macroblock M is accessed, the pixel data is unlikely to be in the cache and a new cache line fill must occur. Likewise, when the first pixel of the luminance block is accessed (assuming that it is not already present within the cache), 32 bytes are written into the cache. At most, only 16 bytes of the 32 bytes are associated with the present luminance block, again resulting in inefficient cache performance.

While this cache storage structure results in inefficient cache performance, such a cache storage structure allows for relatively simple address computation when accessing the information which is stored within the memory. For example, Table 1 shows an example of software for generating addresses for accessing information which is stored within a picture oriented data structure. This example is set forth in the C programming language.

TABLE 1

```
//***********The Picture-Oriented Structure(prior art)***********
struct Luminance_Picture{
    BYTE pixels[PICTURE_SIZE];
}
//*Motion Compensation for Picture-Oriented Structure(prior art)*
#define PICTURE_WIDTH 352
void lum_forw_motion_comp(int x, int y, struct
Luminance_picture*new_lum_pict,
        struct Luminance_Picture*old_lum_pict, intx_mv, int y_mv)
//Variables:
//      x,y - the starting point in the new picture
//      new_lum_pict - the data structure for the current frame
//      old_lum_pict - the data structure for the previous frame
//      x_mv - the x component of the motion vector
//      y_mv - the y component of the motion vector
{   BYTE *new_pix, *old_pix:
    int ptr, i, j:
    new_pix = &(new_lum_pict->pixel[y*PICTURE_WIDTH +
(x+x_mv)]);
    old_pix = &(old_lum_pict->pixel(y+y_mv)
*PICTURE_WIDTH+(x+x_mv)]);

ptr=0;
    for(i=0;i<16;i++)
    { for(j=0;j<16;j++)
        { new_pix[ptr]=old_pix[ptr];
          ptr++;

{
        ptr+=(PICTURE_WIDTH-16);
}
```

In operation, the software for generating addresses for accessing information which is stored within a picture oriented data structure first initializes the actual picture oriented data structure to provide a picture width of 352 pixels. Next, the local variables for the software are defined. Next, the places, i.e., the addresses, in each picture where data is moved to and from are generated. Next, a loop is entered for generating the addresses for accessing the information which is stored within the picture oriented data structure. Within this loop, the data for the first line of the block is accessed merely by incrementing the pointer from the address of the first pixel of the block. Additionally, the data for the first pixels of subsequent lines of the block are accessed by adding the picture width to the address of the first pixel of the previous line. Subsequent pixels in each line are accessed merely by incrementing the pointer from the address of the first pixel of the line.

SUMMARY OF THE INVENTION

It has been discovered that storing video information within a memory using a data structure which is related to the decompression technique advantageously increases the efficiency of processing video information when decoding compressed video information. More specifically, it has been discovered that storing video information within a data structure that is related to the block size of the video information increases the efficiency with which that video information may be accessed.

More specifically, in a preferred embodiment, the invention relates to a system for decoding compressed video information. The system includes an input stream decoding portion, a motion decoding portion, a memory and an adder. The input stream decoding portion receives the compressed video information and provides static decompressed video information. The motion decoding portion receives motion information and provides motion compensated decompressed video information. The memory stores the static decompressed video information and the motion compensated decompressed video information to correspond to macroblocks of video information. The adder receives the staticly decompressed video information from the input stream decoding portion and the motion compensated decompressed video information from the motion decoding portion and provides decoded video information.

Additionally, in a preferred embodiment, the invention relates to a method of storing video information for use when decompressing the video information. The method includes: defining a block size for the video information; defining a number of blocks within a frame of the video information; storing blocks of the video information in a memory within a block oriented data structure; and accessing the blocks of video information when decompressing the video information.

Additionally, the invention relates to an alternate method of storing video information for use when decompressing the video information. The method includes the steps of defining a macroblock size for the video information; defining a number of macroblocks within a frame of the video information; storing the video information in a memory within a macroblock oriented data structure; and accessing the blocks of video information within the macroblock oriented data structure when decompressing the video information.

BRIEF DESCRIPTION OF THE DRAWINGS

FIG. 8 shows a flow chart of accessing video information from memory in accordance with the present invention.

FIG. 10 shows a flow chart of accessing video information from memory on a macroblock basis in accordance with the present invention.

DETAILED DESCRIPTION

The following sets forth a detailed description of the best contemplated mode for carrying out the invention. The description is intended to be illustrative of the invention and should not be taken to be limiting.

Figure 1:
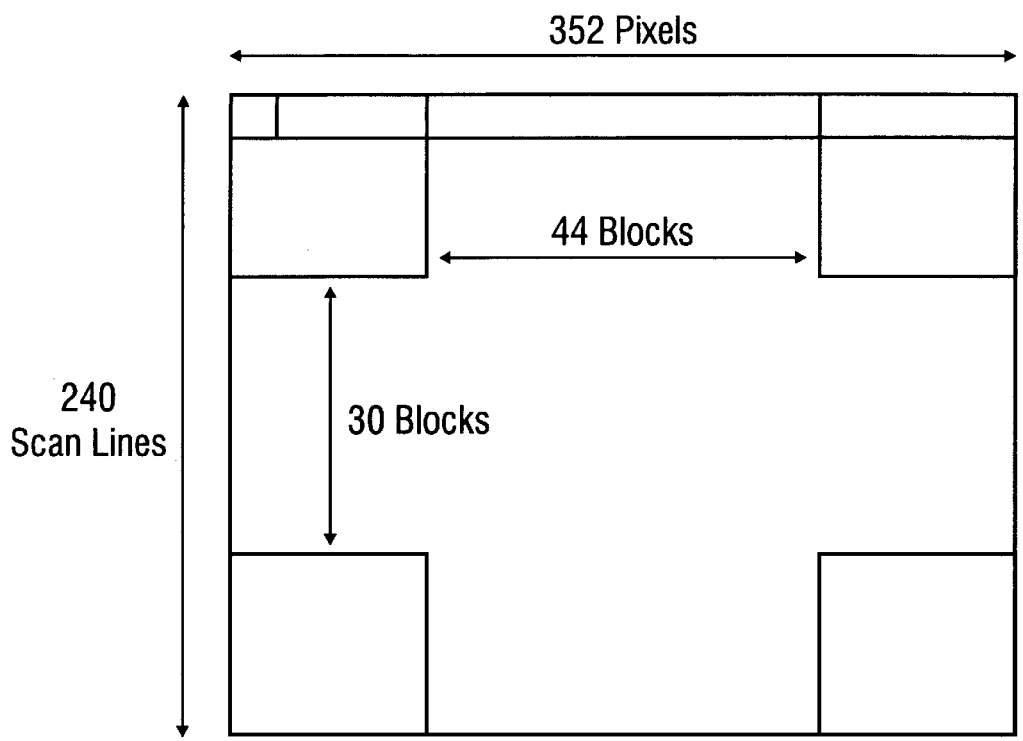
FIG. 1, labeled prior art, shows an arrangement of blocks of pixels on a display screen.
Figure 2:
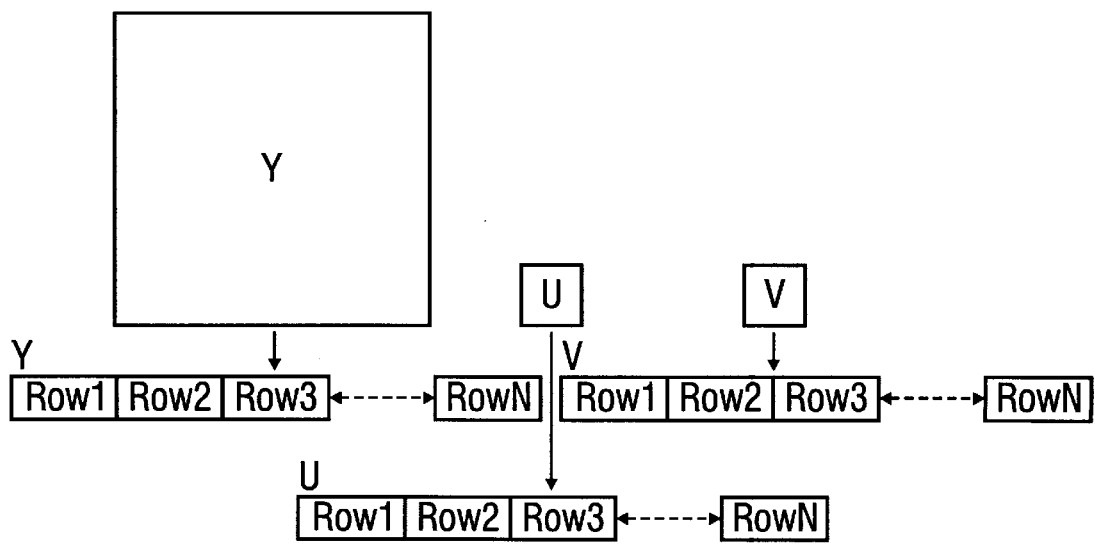
FIG. 2, labeled prior art, shows an example of the storage in memory of a block of video information.
Figure 3:
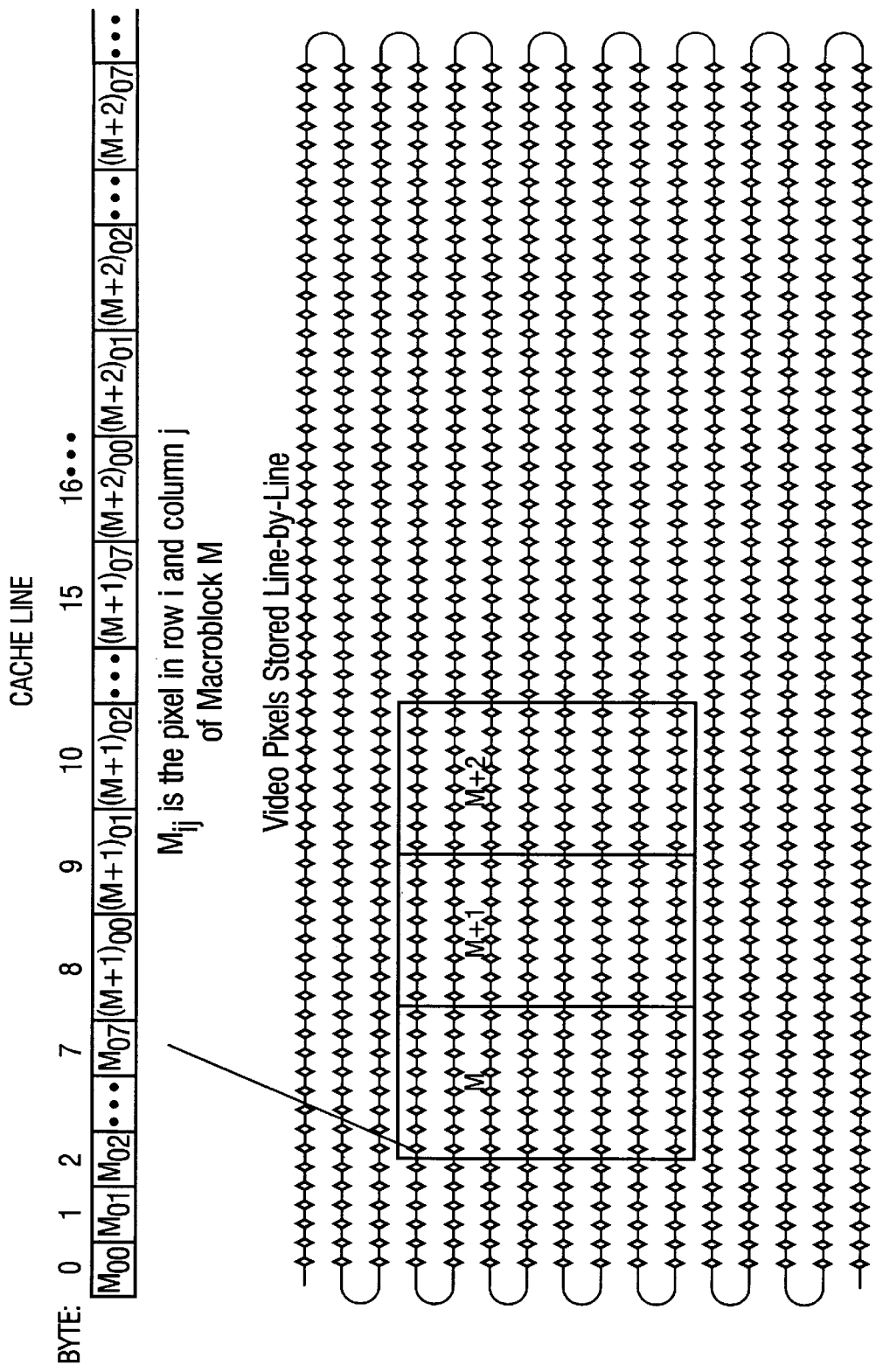
FIG. 3, labeled prior art, shows an example of storing video information is a cache.
Figure 4:
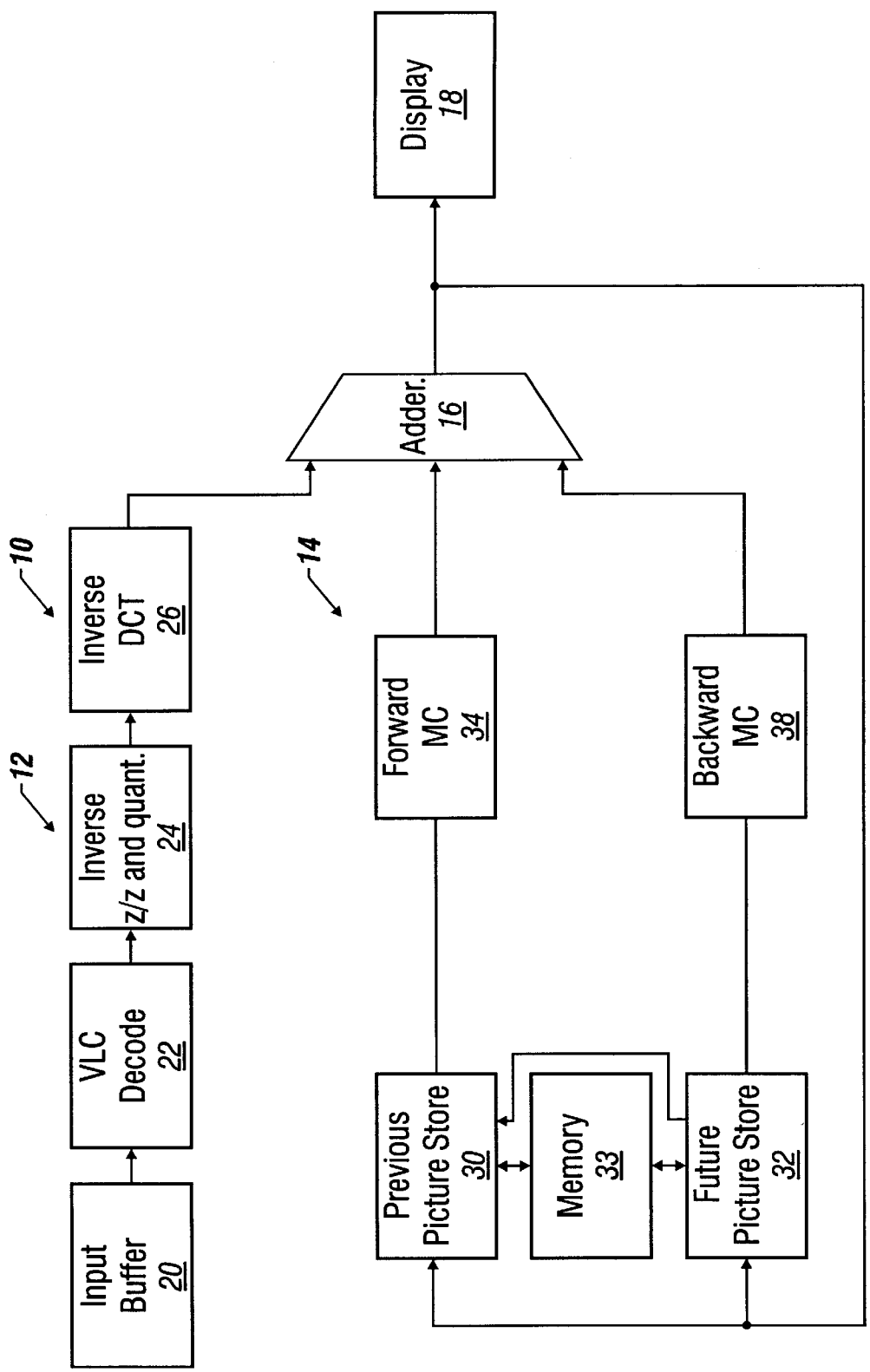
FIG. 4 shows a block diagram of a decoder video system in accordance with the present invention.

Referring to FIG. 4, a system for decompressing video information is shown. Video system 10 includes input stream decoding portion 12, motion decoding portion 14, adder 16 and display device 18. Input stream decoding portion 12 includes input buffer 20, variable length coding (VLC) decoder 22, inverse zig zag and quantizer circuit 24 and inverse digital cosine transform circuit 26. Motion decoding portion 14 includes previous picture store circuit 30, future picture store circuit 32, memory 33, forward motion compensation circuit 34 and backward motion compensation circuit 38. Display device 18 includes a frame buffer (not shown) which allows information provided by adder 16 to be rasterized prior to display by display device 18.

The output signals from input stream decoding portion 12 as well as from forward motion compensation circuit 34 and backward motion compensation circuit 38 of motion decoding portion 14 are provided to adder 16 on a block by block basis. Adder 16 provides an output video signal to display 18 on a frame by frame basis. The output video signal is also provided as a previous picture signal to previous picture store circuit 30 and future picture store circuit 32 of motion decoding portion 14.

Figure 5A:
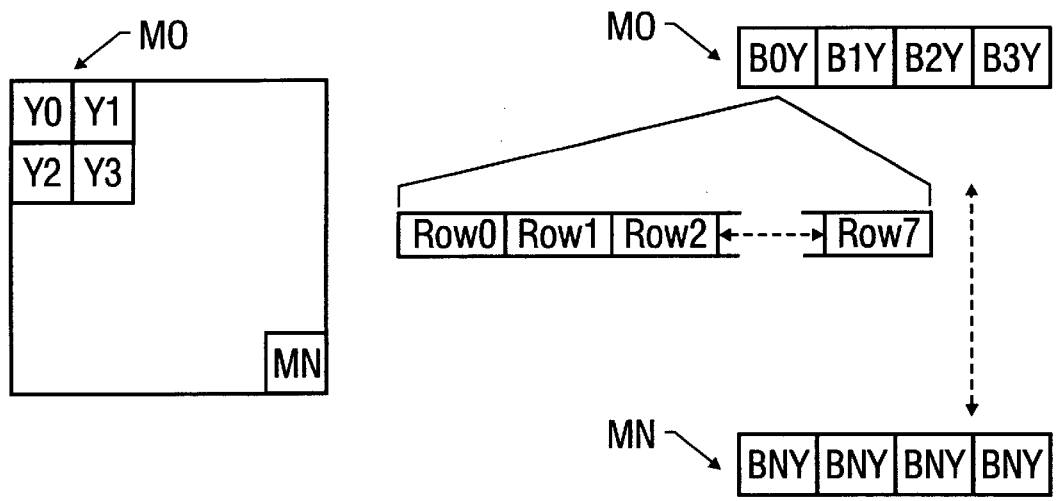
FIGS. 5A and 5B show an example of the storage in memory of a block of video information in accordance with the present invention.
Figure 5B:
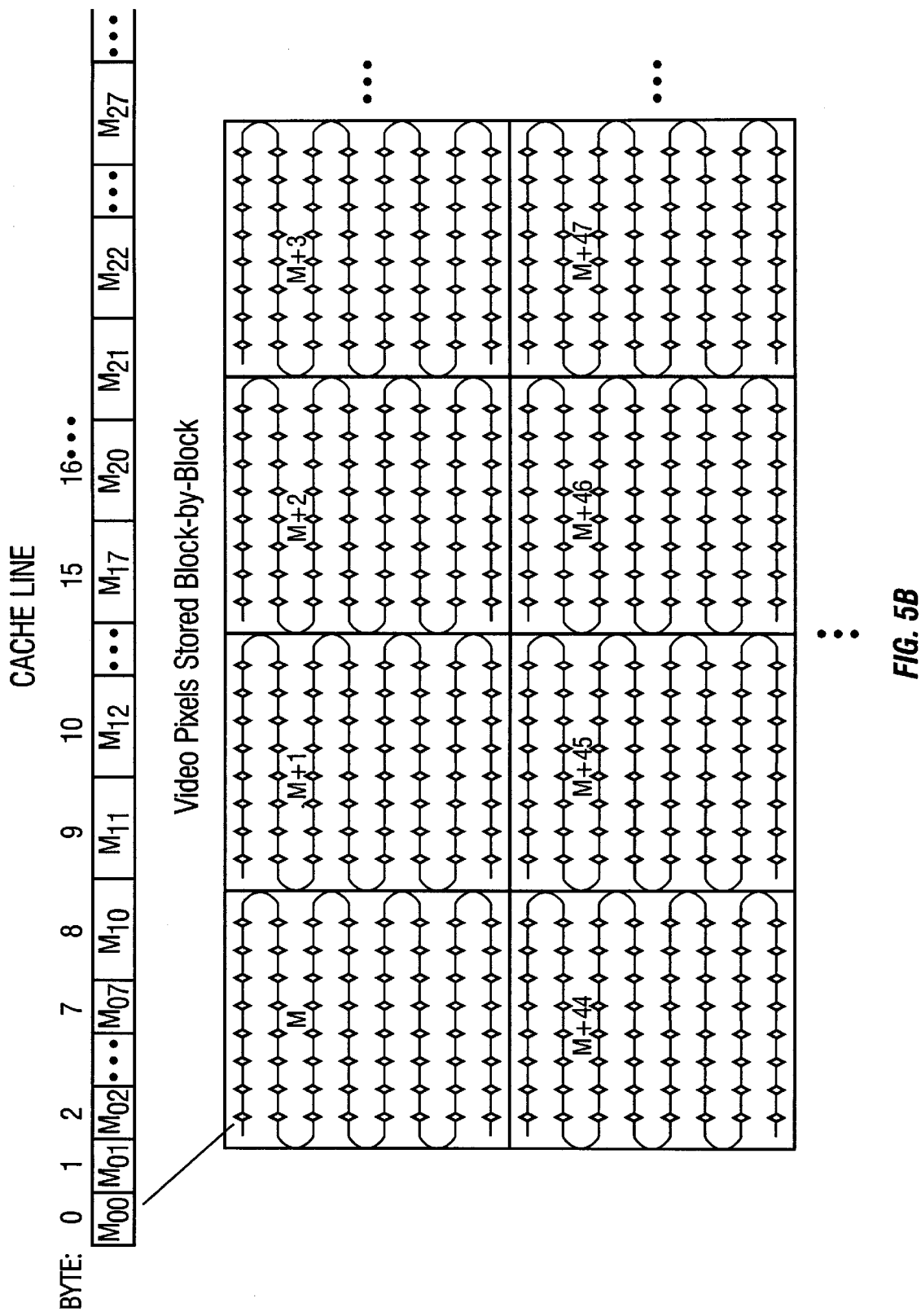

Referring to FIGS. 5A and 5B, block diagrams showing the order in which pixels of a frame of video information are stored in memory 33 is shown. When a frame of video information is stored within memory 33, the video information is stored to correspond to macroblocks of video information. More specifically, the frame of video information is stored in a block oriented structure, i.e., the frame of video information is stored on a block by block basis. Storing the video information in a block oriented structure allows efficient memory accessing when processing a frame of video information because the processing is performed on a block by block basis. Additionally, the blocks are stored to account for the block's location within a macroblock. For example, for the first macroblock of a frame, the four Y blocks of the macroblock are stored sequentially within memory 33. Storage of each block is done on a row by row basis. I.e., the 8 pixels of the first row of a block are stored, followed by the 8 pixels of the second row of the block, and so on. In this storage arrangement, each block of video information is contiguously stored, thus allowing easy memory access for processing of the block.

Figure 6:
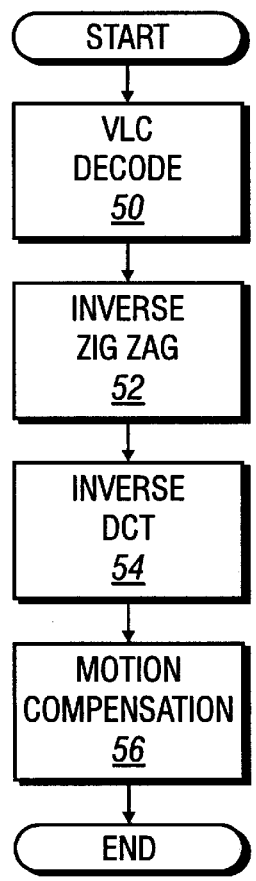
FIG. 6 shows a flow chart of the decoding of video information which is encoded using the MPEG standard.

Referring to FIGS. 4 and 6, in operation, input buffer 20 receives a compressed video signal from a video signal source such as a CD ROM (not shown); the compressed video signal is provided as a stream of compressed video information. Input buffer 20 buffers this compressed video signal to compensate for the speed which the signal is provided by the video source. This buffered compressed video signal is provided to VLC decoder 22 which decodes the variable length coded portion of the compressed signal at VLC decoding step 50 to provide a variable length decoded signal. The variable length decoded signal is provided to inverse zig zag and quantizer circuit 24 which, at inverse zig zag and quantization step 52, decodes the variable length decoded signal to provide a zig zag decoded signal. The inverse zig zag and quantization step 52 compensates for the fact that while a compressed video signal is compressed in a zig zag fashion, the zig zag decoded signal is provided to inverse DCT circuit 26 as sequential frequency coefficients in a block of video information.

This zig zag decoded signal is then provided to inverse DCT circuit 26 which, at inverse DCT step 54, performs an inverse digital cosine transform on the zig zag decoded video signal to provide an inverse digital cosine transformed signal. The inverse digital cosine transform operation is performed on the video information on a block by block basis to provide blocks of static inverse transformed pixels.

The blocks of static inverse transformed pixels are provided to adder 16 which, if the signal does not include any motion compensation information (i.e., if the signal is part of an I frame) provides this signal to display 18. However, for video information which includes motion information (i.e., signals which are part of B frames and P frames), adder 16 uses the forward motion compensation and backward motion compensation outputs from motion decode portion 19 to generate the video information which is provided to display 18 at motion compensation step 56. More specifically, forward motion vectors are used to locate information in previous picture store circuit 30 and backward motion vectors are used to locate information in future picture store circuit 32 and this information is added to the output provided by inverse DCT circuit 26.

Figure 7:
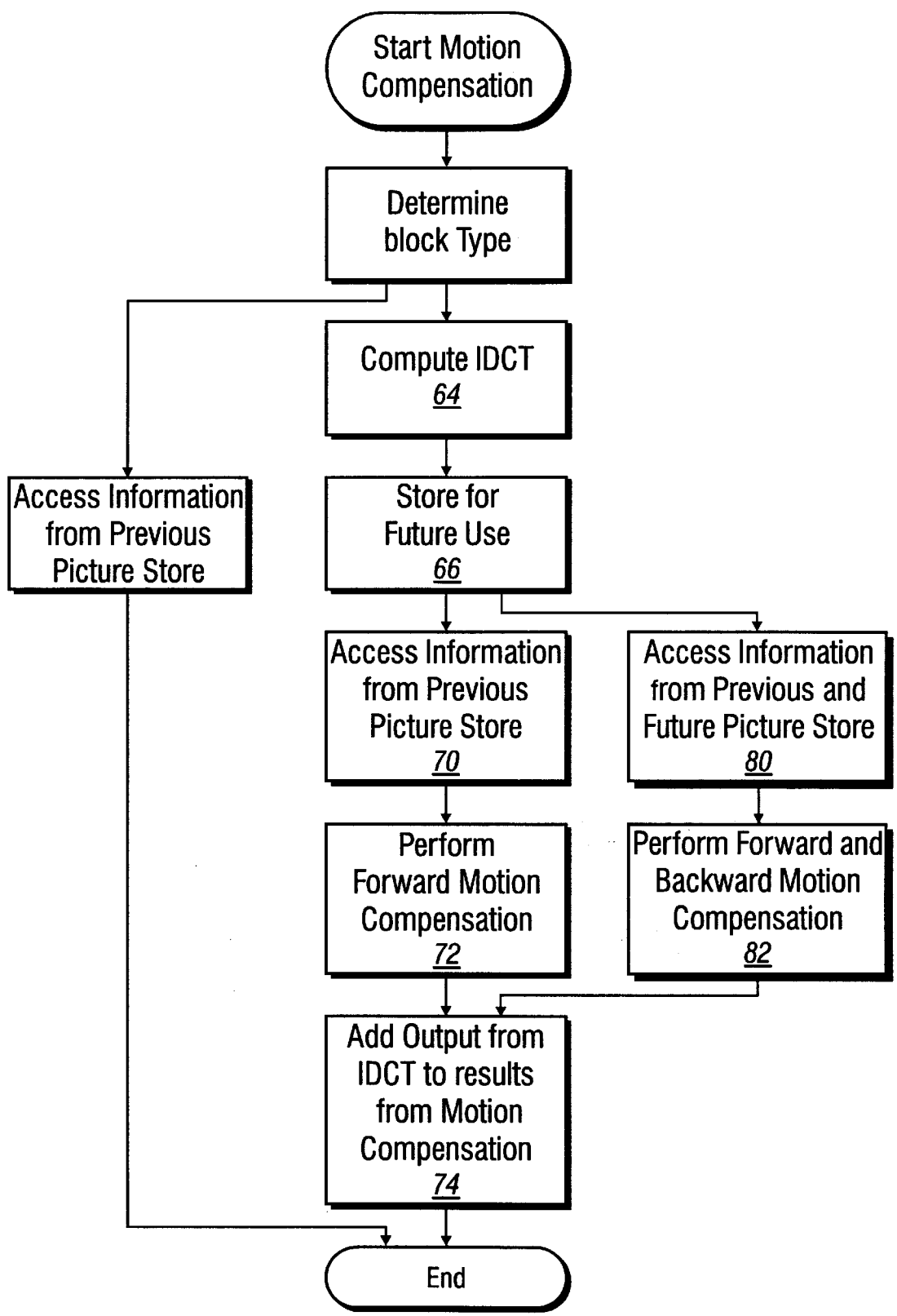
FIG. 7 shows a flow chart of the motion compensation step of the FIG. 6 flow chart.

Referring to FIGS. 4, 6 and 7, when decompressing the blocks of video information which are provided by inverse zig zag step 52, the block type of the block is first determined at determine block type step 60. The block type determines whether or not processing of the block should be skipped. If the block type is to be skipped, then the block from previous picture store 30 is accessed and that block is provided as the motion compensation output. If the block is not skipped, then control passes to inverse DCT step 54.

While motion compensation occurs on a frame by frame basis, the actual processing of the video information is performed on a block by block basis. After the motion compensation for an entire frame is completed, control returns to process the next frame of video information.

During inverse DCT step 54, the inverse DCT of the block is computed at compute IDCT step 64 and the result of this computation is stored for later use in store step 66. Control then passes to motion compensation step 56. When control passes to motion compensation step 56, the block is first reviewed to determine the type of motion compensation to perform at determine type step 70.

If the frame is an I frame, on which no motion compensation is performed, then the inverse DCT output from inverse DCT portion 26 provides the frame output. However, as set forth above, the blocks of static inverse transformed video information are also provided to previous picture store circuit 30 at store step 66. Previous picture store circuit 30 stores the blocks of video information in memory 33 for access in performing motion compensation on future frames of video information.

If the frame is a P frame, then motion compensation is performed and motion compensation portion 14 is used. More specifically, previous picture information is accessed from memory 33 via previous picture store circuit 30 at previous picture access step 71. The previous picture information is then forward motion compensated by forward motion compensation circuit 34 at forward motion compensation step 72 to provide a forward motion compensated video signal. Then at add picture step 74, the corresponding block of static inverse transformed video information which is provided by inverse DCT circuit 26 is added with the forward motion compensated video signal to provide a block of the P frame of video information. Next at store step 76, the P frame is stored in memory 33 via future picture store circuit 32 for future use.

If the frame is a B frame, then motion compensation is performed and motion compensation portion 14 is used. More specifically, previous picture information and future picture information are accessed from memory 33 via previous picture store circuit 30 and future picture store circuit 32 at picture access steps 71, 80. The previous picture information is then forward motion compensated by forward motion compensation circuit 34 at forward motion compensation step 72 to provide a forward motion compensated video signal. Additionally, the future picture information is backward motion compensated by backward motion compensation circuit 38 at motion compensation step 82 to provide a backward motion compensated video signal. Then at add picture step 74, the staticly decompressed video signal which is provided by inverse DCT circuit 26 is added with the forward motion compensated video signal and the backward motion compensated video signal to provide a block of the B frame of video information.

Table 2 sets forth software for generating addresses for accessing video information which is stored within a block oriented data structure. This software is set forth in the C programming language. FIG. 7 shows the corresponding flow chart for accessing video information which is stored within a block oriented data structure.

TABLE 2

```
//****************The Block-Oriented Structure*****************
#define BLOCK_SIZE 64          // These numbers are for MPEG SIF
                                                    Images define NBR_OF_MACROBLOCKS 330 struct Block {
        BYTE pixels[BLOCK_SIZE];

} struct Luminance_Picture {
        Block Y[NBR_OF_MACROBLOCKS*4];

}

//*Motion Compensation for Block-Oriented Structure* define PICTURE_WIDTH 352
define YB_WIDTH 88 void lum_forw_motion_comp( intx, inty, struct Luminance_Picture
*new_lum_pict, struct Luminance_Picture     *old_lum_pict, int
x_mv, int y_mv)

//Variables:
// x,y - the starting point in the new picture
// new_lum_pict - the data structure for the current frame
// old_lum_pict - the data structure for the previous frame
// x_mv - the x component of the motion vector
// y_mv - the y component of the motion vector { BYTE *new_pix;
  int yb[4], ptr[4], vsplit, hsplit, i, xj, yj];

for(xj=0; xj<16;xj=xj+8)
  { for (yj=0; yj<16; yj=yj+8)
      { xp=x+xj;
        yp=y+yj;
        new_pix =&(new_lum_pict->Y[xp>>2+(yp>>2) *YB_WIDTH]->pixels);
        yb[0]=(xp+x_mv)>>2+((yp+y_mv)>>2)*YB_WIDTH;
        yb[1]=(xp+x_mv+8)>>2+((yp+y_mv)>>2)*YB_WIDTH;
```

TABLE 2-continued

```
        yb[2]=(xp+x_mv)>>2+((yp+y_mv+8)>>2)*YB_WIDTH;
        yb[3]=(xp+x_mv+8)>>2+((yp+y_mv+8)>>2)*YB_WIDTH;
        vsplit=y_mv & 7;
        hsplit=x_my & 7;
        ptr[0]=hsplit+vsplit*8;
        ptr[1]=vsplit *8;
        ptr[2]=hsplit;
        ptr[3]=0;
        for(i=0; i<8-vsplit; i++)
        { Move_Bytes( *(new_pix), &(old_lum_pict->Y[yb[0]]->pixels[ptr[0]]), hsplit);
            new_pix+=hsplit;
            ptr[0]+= 8;
            Move_Bytes( *(new_pix), &(old_lum_pict->Y[yb[1]]->pixels[ptr[1]]), 8-hsplit);
            new_pix +=8-hsplit;
            ptr[1]+=8;
        }
        {
        for(i=0; i<vsplit; i++)
        { Move_Bytes( *(new_pix), &(old_lum_pict->Y(yb[2]]->pixels[ptr[2]]), hsplit);
            new_pix +=8-hsplit;
            ptr[3]+=8;
          }
        }
    }
}
```

In operation, the software for generating addresses for accessing information which is stored within a block oriented data structure first initializes the actual block oriented data structure to define a block width of 64 pixels. Next, the data structure for a frame of information is initialized as the number of macroblocks multiplied by four, for the number of blocks within a macroblock. Accordingly, the frame data structure is set up as a contiguous plurality of block data structures. More specifically, the data structure for a frame of video information includes a plurality of linear structures which each store respective blocks of eight by eight block of pixels. Next, the number of macroblocks within a frame are defined as 330 macroblocks.

Next, the picture width and the block width of the frame are defined. Next, the local variables for the software are defined. Next, the places, i.e., the addresses, in each picture where data is moved to and from are generated.

Next, a number of nested loops are entered for generating the addresses for accessing the information which is stored within the block oriented data structure. Within these loops, a set of four pointers track the addressing information for each of the blocks of a macroblock. Within these loops, the data for the first line of the first block of the macroblock is accessed by incrementing the first block pointer from the address of the first pixel of the first block. Additionally, the data for the pixels of subsequent lines of the first block of the macroblock are accessed by adding the block width to the address of the first pixel of the previous line. Subsequent pixels in each line of the first block of the macroblock are accessed by incrementing the pointer from the address of the first pixel of the previous line. Additional pointers track the locations of the other three blocks of the macroblock in a similar manner.

OTHER EMBODIMENTS

Other embodiments are within the following claims.

For example, the various modules or portions of video system 10 may be provided in either hardware or software or a combination thereof. For example, video system 10 may be provided by software that is designed to be executed on a microprocessor.

Figure 9:
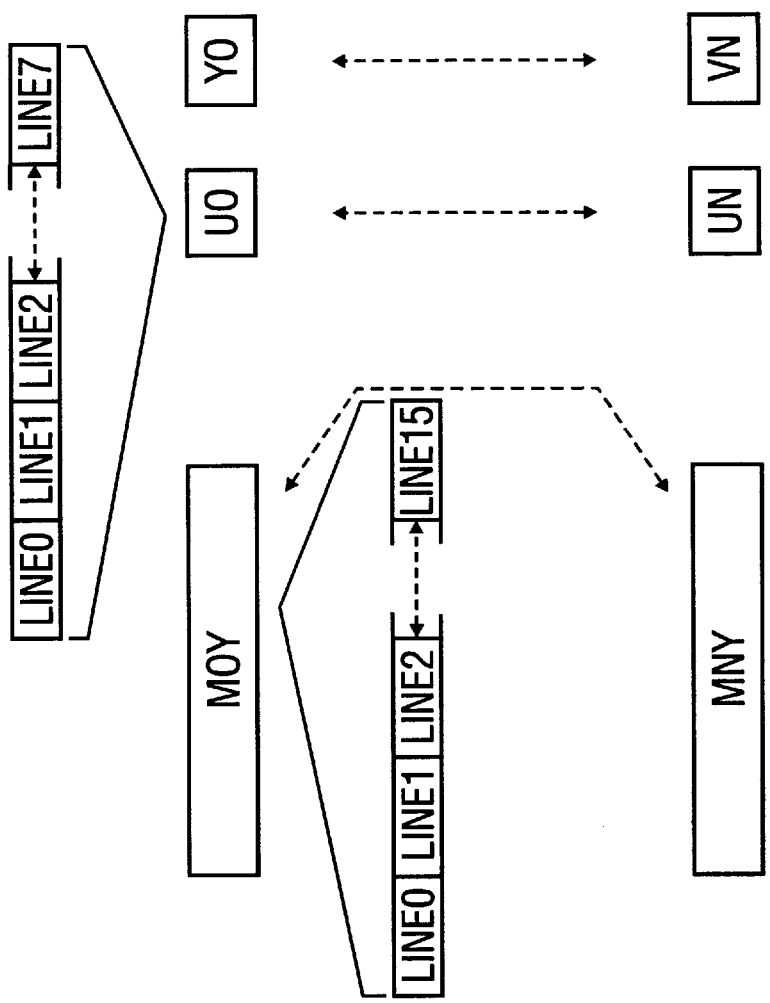
FIG. 9 shows an example of the storage in memory of a macroblock of video information in accordance with the present invention.
Figure 9:
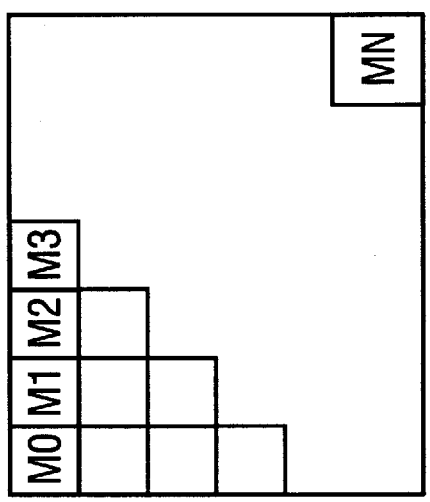

Also for example, referring to FIG. 9, in an alternate embodiment, a frame of video information is stored to correspond to a macroblock of video information but is stored within memory 33 in a macroblock oriented data structure, i.e., on a macroblock by macroblock basis. With this storage arrangement, the macroblocks are stored to account for the pixel locations within a macroblock. For example, for the first macroblock of a frame, the sixteen Y lines of the macroblock are stored sequentially within memory 33. In this storage arrangement, each line of video information is contiguously stored, thus allowing easy memory access for processing of the block.

Table 3 sets forth software for generating addresses for accessing video information which is stored within a macroblock oriented data structure. This software is set forth in the C programming language. FIG. 10 shows the corresponding flow chart for accessing video information which is stored within a block oriented data structure.

TABLE 3

```
//***********The Macroblock-Oriented Structure************ define LUM_MB_SIZE 256      //These numbers are for MPEG SIF
                               images
define NBR_OF_MACROBLOCKS 330 struct Luminance_Macroblock {
        BYTE pixels[LUM_MB_SIZE];

} struct Luminance_Picture {
        Luminance_Macroblock MB[NBR_OF_MACROBLOCKS];
}

//**Motion Compensation for MacroBlock-Oriented Structure** define PICTURE_WIDTH 352
define MB_WIDTH 22 void lum_forw_motion_comp(int x, int y, struct Luminance_Picture
*new_lum_pict, struct Luminance_picture   *old_lum_pict, int x_mv,
int y_mv)

// Variables:
//      x,y - the starting point in the new picture
//      new_lum_pict - the data structure for the current frame
//      old_lum_pict - the data structure for the previous frame
//      x_mv - the x component of the motion vector
//      y_mv - the y component of the motion vector { BYTE *new_pix;
  int mb[4], vsplit, hsplit, i;

new_pix =&(new_lum_pict->MB[x>>4+(y>>4)*MB_WIDTH]-
>pixels);
  mb[0]=(x+x_mv)>>4+((y+y_mv)>>4)*MB_WIDTH;
  mb[1]=(x+x_mv+16)>>4+((y+y_mv)>>4)*MB_WIDTH;
  mb[2]=(x+x_mv)>>4+((y+y_mv+16)>>4)*MB_WIDTH;
  mb[3]=(x+x_mv+16)>>4+((y+y_mv+16)>>4)*MB_WIDTH;
  vsplit=y_mv & 15;
  hsplit=x_mv & 15;
  ptr[0]=hsplit + vsplit*16;
  ptr[1]=vsplit * 16;
  ptr[2]=hsplit;
  ptr[3]=0;

for (i=0; i<16-vsplit; i++)
  {    Move_Bytes( *(new_pix), &(old_lum_pict->MB[mb[0]-
>pixels[ptr[0], hsplit);
       new_pix+=16;
       ptr[0]+=16;
       Move_Bytes( *(new_pix), &(old_lum_pict->MB[mb[1]]-
>pixels[ptr[1]]), 16-hsplit);
       new_pix+= 16-hsplit;
       ptr[1]+= 16;
```

TABLE 3-continued

```
  }
  for (i=0 ;i<vsplit; i++)
  {    Move_Bytes( *(new_pix), &(old_lum_pict->MB[mb[2]]-
>pixels[ptr[2]]), hsplit );
       new_pix+=hsplit;
       ptr[2]+=16;
       Move_Bytes( *(new_pix), &(old_lum_pict->MB[mb[3]]-
>pixels[ptr[3]), 16-hsplit);
       new_pix+=16-hsplit;
       ptr[3]+=16;
  }
}
```

In operation, the software for generating addresses for accessing information which is stored within a macroblock oriented data structure first initializes the actual macroblock oriented data structure to define a macroblock width of 256 pixels. Next, the data structure for a frame of information is initialized as the number of macroblocks within a frame. Accordingly, the frame data structure is set up as a contiguous plurality of macroblock data structures. More specifically, the data structure for a frame of video information includes a plurality of linear structures which each store respective macroblocks of sixteen by sixteen block of pixels. (Of course, the structures for the chrominance portions of the macroblock structure are respective macroblocks of eight by eight blocks of pixels.) Next, the number of macroblocks within a frame are defined as 330 macroblocks.

Next, the picture width and the macroblock width of the frame are defined. Next, the local variables for the software are defined. Next, the places, i.e., the addresses, in each picture where data is moved to and from are generated.

Next, a loop is entered for generating the addresses for accessing the information which is stored within the macroblock oriented data structure. Within this loop, a set of four pointers track the addressing information for each of the blocks of a macroblock. Within the loop, the data for the first line of the first block of the macroblock is accessed by incrementing the first block pointer from the address of the first pixel of the first block. Additionally, the data for the pixels of subsequent lines of the first block of the macroblock are accessed by adding the block width to the address of the first pixel of the previous line. Subsequent pixels in each line of the first block of the macroblock are accessed by incrementing the pointer from the address of the first pixel of the previous line. Additional pointers track the locations of the other three blocks of the macroblock in a similar manner.

Also, for example, while the invention is described with reference to general memory, it will be appreciated that the memory in which the video information is stored may be a cache. In this instance, blocks of video information which are stored within the higher level memory may or may not be stored to correspond to macroblocks.

Also, for example, while in the preferred embodiment, video information which is written to display 18 is bit mapped on a frame basis, it is contemplated that video information may be written to a frame buffer to correspond to macroblocks and that display 18 would have addressing capabilities to rasterize the macroblock oriented video information.

What is claimed is:

1. A system for decoding compressed video information, the compressed video information including a block size for the video information and including a number of blocks within a frame of the video information, the system comprising:

an input stream decoding portion, the input stream decoding portion receiving the compressed video information and providing static decompressed video information;

a motion decoding portion, the motion decoding portion receiving motion information and providing motion compensated decompressed video information;

a memory, the memory storing the static decompressed video information and the motion compensated decompressed video information to correspond to a plurality of blocks of video information, the memory storing the blocks of the video information in a memory within a block oriented data structure such that lines of blocks are stored sequentially to enhance subsequent memory access to the blocks;

the motion decoding portion accessing the blocks of video information within the block oriented data structure of the memory when decompressing the video information; and an adder, the adder receiving the static decompressed video information from the input stream decoding portion and the motion compensated decompressed video information from the motion decoding portion and providing decoded video information.

2. The system of claim 1 wherein
information within the blocks are stored on a block by block basis in memory.

3. The system of claim 2 wherein
the plurality of blocks are arranged as macroblocks;
each macroblock includes a plurality of luminance blocks and a plurality of chrominance blocks;
the luminance blocks of the macroblock are contiguously stored in memory, and
the chrominance blocks of the macroblock are contiguously stored in memory.

4. The system of claim 1 wherein the memory is a microprocessor cache.

5. The system of claim I wherein
subsequent contiguous blocks of video information are contiguously stored in the memory to provide a frame structure.

6. The system of claim 1 wherein:
the system computes the addresses of pixels of video information on a block by block basis when accessing the blocks of video information.

7. The system of claim 1 wherein:
the system defines a frame width of the video information, and
the system defines how many blocks wide the frame of video information is.

8. The system of claim 7 wherein
the frame width is 352 pixels and the frame is 44 blocks wide.

9. The system of claim 6 wherein
the video information includes luminance video information and chrominance video information; and, the system further comprises
means for decompressing all of the luminance video information of a frame sequentially; and
means for decompressing all of the chrominance video information of a frame sequentially.

10. The system of claim 1 wherein
the block size is 64 pixels.

11. The system of claim 1 wherein
subsequent contiguous blocks of video information are contiguously stored in the memory to provide a frame structure, the size of the frame structure defined as the block size multiplied by the number of blocks in the frame.

12. A system for storing video information for use when decompressing compressed video information, the compressed video information defined by a block size for the video information and defined by a number of blocks within a frame of the video information, the system, the comprising:

an input stream decoding portion, the input stream decoding portion receiving the compressed video information and providing static decompressed video information;

a motion decoding portion, the motion decoding portion receiving motion information and providing motion compensated decompressed video information;

a memory, the memory storing the static decompressed video information and the motion compensated decompressed video information to correspond to macroblocks of video information, the memory storing blocks of the video information in a memory within a block oriented data structure such that lines of blocks are stored sequentially to enhance subsequent memory access to the blocks, and the memory accessing the blocks of video information within the block oriented data structure of the memory when decompressing the video information;

an adder, the adder receiving the static decompressed video information from the input stream decoding portion and the motion compensated decompressed video information from the motion decoding portion and providing decoded video information;

means for defining a macroblock size for the video information;

means for defining a number of macroblocks within a frame of the video information;

means for storing the video information in a memory within a macroblock oriented data structure such that lines of macroblocks are stored sequentially to enhance subsequent memory access to the macroblocks; and means for accessing the video information within the macroblock oriented data structure of the memory when decompressing the video information.

13. The system of claim 12 further comprising:
means for computing the addresses of pixels of video information on a block by block basis within the macroblock oriented data structure when accessing the video information.

14. The system of claim 12 further comprising
means for defining a frame width of the video information, and
means for defining how many macroblocks wide the frame of video information is.

15. The system of claim 14 wherein
the frame width is 352 pixels and the frame is 22 macroblocks wide.

16. The system of claim 13 wherein
the video information includes luminance video information and chrominance video information; and, further comprising
means for decompressing all of the luminance video information of a frame sequentially; and
means for decompressing all of the chrominance video information of a frame sequentially.

17. The system of claim 12 wherein
the macroblock size is 256 pixels.

18. The system of claim 12 wherein
subsequent contiguous blocks of video information are contiguously stored in the memory to provide a frame structure, the size of the frame structure being defined as the macroblock size multiplied by the number of macroblocks in the frame.

19. A method of storing video information for use when processing a frame of the video information on a unit by unit basis, the frame of video information including a plurality of units, each of the units including a plurality of lines of pixels, the method comprising:
providing an input stream decoding portion, a motion decoding portion, a memory and an adder, the input stream decoding portion coupled to the motion decoding portion, and the memory coupled to the adder and the motion decoding portion;
receiving compressed video information by the input stream decoding portion and providing static decompressed video information;
receiving motion information by the motion decoding portion and providing motion compensated decompressed video information,;
storing static decompressed video information and the motion compensated decompressed video information in the memory to correspond to macroblocks of video information;
storing blocks of the video information in the memory, the memory within a block oriented data structure such that lines of blocks are stored sequentially to enhance subsequent memory access to the blocks, and the memory accessing the blocks of video information within the block oriented data structure of the memory when decompressing the video information;
receiving the static decompressed video information by the adder from the input stream decoding portion and the motion compensated decompressed video information from the motion decoding portion and providing decoded video information;
initialing a frame data structure in a memory, the frame data structure including a number of unit data structures;
storing pixels of each unit of the frame of video information within a respective one of the unit data structures in the memory such that the lines of each unit are stored sequentially to enhance subsequent memory access to each unit; and
accessing the pixels of video information within unit data structures in the memory when processing the video information.

20. The method of claim 19 wherein
each of the unit data structures has a unit size;
the method includes addressing each pixel of video information in the memory with a pointer having a pointer value, the pointer addressing pixels in a row of a unit by incrementing the pointer value, the pointer addressing pixels in subsequent units of the frame by adding the unit size to the pointer value.

21. The method of claim 20 wherein
each of the units includes
a plurality of pixel rows, each of the pixel rows having a first row size, and
a plurality of pixel columns, each of the pixel columns having a first column size;
the unit size is equal to the first row size multiplied by the first column size; and
the pointer addresses pixels in subsequent rows of a unit by adding the first row size to the pointer value.

22. The method of claim 20 wherein
the frame data structure has a frame size equal to the unit size multiplied by the number of unit data structures.

23. The method of claim 19 wherein each unit includes
a first number of luminance units, each of the luminance units including
a plurality of luminance pixel rows having a first row size, and
a plurality of luminance pixel columns having a first column size; and
a second number of chrominance units, each of the chrominance units including
a plurality of chrominance pixel rows having a second row size, and
a plurality of chrominance pixel columns having a second column size.

24. The method of claim 23 wherein
the luminance units include pixels of luminance video information, each pixel of luminance video information corresponding to an image pixel, and
the chrominance units include pixels of chrominance video information, each pixel of chrominance video information corresponding to four image pixels.

25. The method of claim 19 wherein the video information is represented according to the motion picture experts group standard.

26. The method of claim 19 wherein the unit size is defined to be 64 pixels.

27. The method of claim 19 wherein the unit size is defined to be 256 pixels.

* * * * *